United States Patent
Hinami

(10) Patent No.: US 12,344,043 B2
(45) Date of Patent: Jul. 1, 2025

(54) TWO-WHEELED VEHICLE TIRE FOR RUNNING ON ROUGH TERRAIN

(71) Applicant: Sumitomo Rubber Industries, Ltd., Kobe (JP)

(72) Inventor: Yukiko Hinami, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 73 days.

(21) Appl. No.: 18/210,989

(22) Filed: Jun. 16, 2023

(65) Prior Publication Data

US 2024/0001718 A1    Jan. 4, 2024

(30) Foreign Application Priority Data

Jul. 4, 2022 (JP) ................. 2022-107854

(51) Int. Cl.
*B60C 11/11*    (2006.01)
*B60C 11/12*    (2006.01)

(52) U.S. Cl.
CPC ............ *B60C 11/12* (2013.01); *B60C 11/11* (2013.01); *B60C 2200/14* (2013.01)

(58) Field of Classification Search
CPC ......... B60C 11/11; B60C 11/12; B60C 11/13; B60C 2200/12; B60C 2200/14
See application file for complete search history.

(56) References Cited

U.S. PATENT DOCUMENTS

| | | | |
|---|---|---|---|
| 11,325,425 | B2 | 5/2022 | Shirakami |
| 2020/0023687 | A1 * | 1/2020 | Miwa ...................... B60C 11/11 |
| 2021/0138840 | A1 | 5/2021 | Wakabayashi et al. |

FOREIGN PATENT DOCUMENTS

| | | | | |
|---|---|---|---|---|
| EP | 1106392 | A2 * | 6/2001 | ......... B29D 30/0606 |
| EP | 3795386 | B1 * | 11/2023 | ......... B60C 11/0302 |
| JP | 2020-32849 | A | 3/2020 | |
| JP | 2020-185814 | A | 11/2020 | |
| JP | 2020179681 | A * | 11/2020 | |
| JP | 2022-20427 | A | 2/2022 | |

OTHER PUBLICATIONS

Extended European Search Report for European Application No. 23175228.8, dated Oct. 31, 2023.

* cited by examiner

*Primary Examiner* — Cedrick S Williams
(74) *Attorney, Agent, or Firm* — Birch, Stewart, Kolasch & Birch, LLP

(57) ABSTRACT

A two-wheeled vehicle tire for running on rough terrain, the tire comprising a tread portion. The tread portion comprises a plurality of middle blocks located between a tire equator and a tread edge. The plurality of middle blocks comprises at least one first middle block having an outer surface in a tire radial direction, and at least one second middle block having an outer surface in the tire radial direction whose area is larger than an area of the outer surface of the at least one first middle block. The outer surface in the tire radial direction of the at least one first middle block is not provided with sipes. The outer surface of the at least one second middle block is provided with at least one sipe.

15 Claims, 10 Drawing Sheets

TWO-WHEELED VEHICLE TIRE FOR RUNNING ON ROUGH TERRAIN

RELATED APPLICATIONS

This application claims the benefit of foreign priority to Japanese Patent Application No. JP2022-107854, filed Jul. 4, 2022, which is incorporated by reference in its entirety.

FIELD OF THE DISCLOSURE

The present disclosure relates to a two-wheeled vehicle tire for running on rough terrain.

BACKGROUND OF THE DISCLOSURE

Patent document 1 below discloses a tread portion of a two-wheeled vehicle tire for running on rough terrain. The tread portion of the tire includes middle block rows which includes a plurality of middle blocks arranged in the tire circumferential direction. The middle block rows include an array unit in which two or more types of the middle blocks with different tread areas are arranged one by one in the tire circumferential direction in order of the tread area.

PATENT DOCUMENT

[Patent document 1] Japanese Unexamined Patent Application Publication No. 2022-020427

SUMMARY OF THE DISCLOSURE

In the above tire, the sipes reduce the rigidity of the blocks with small tread area, and there has been room for improvement in slide control on hard road surfaces.

The present disclosure has been made in view of the above circumstances and has a major object to provide a two-wheeled vehicle tire for running on rough terrain capable of exhibiting stable slide controllability on both soft and hard road surfaces.

In one aspect of the present disclosure, a two-wheeled vehicle tire for running on rough terrain, the tire comprises a tread portion, wherein the tread portion comprises a plurality of middle blocks located between a tire equator and a tread edge, the plurality of middle blocks comprises at least one first middle block having an outer surface in a tire radial direction, and at least one second middle block having an outer surface in the tire radial direction whose area is larger than an area of the outer surface of the at least one first middle block, the outer surface in the tire radial direction of the at least one first middle block is not provided with sipes, and the outer surface of the at least one second middle block is provided with at least one sipe.

BRIEF DESCRIPTION OF THE DRAWINGS

FIG. 5 is an enlarged plan view of a first middle block and a second middle block in

FIG. 2;

DETAILED DESCRIPTION OF THE DISCLOSURE

An embodiment of the present disclosure will be described below with reference to the drawings.

Figure 1:
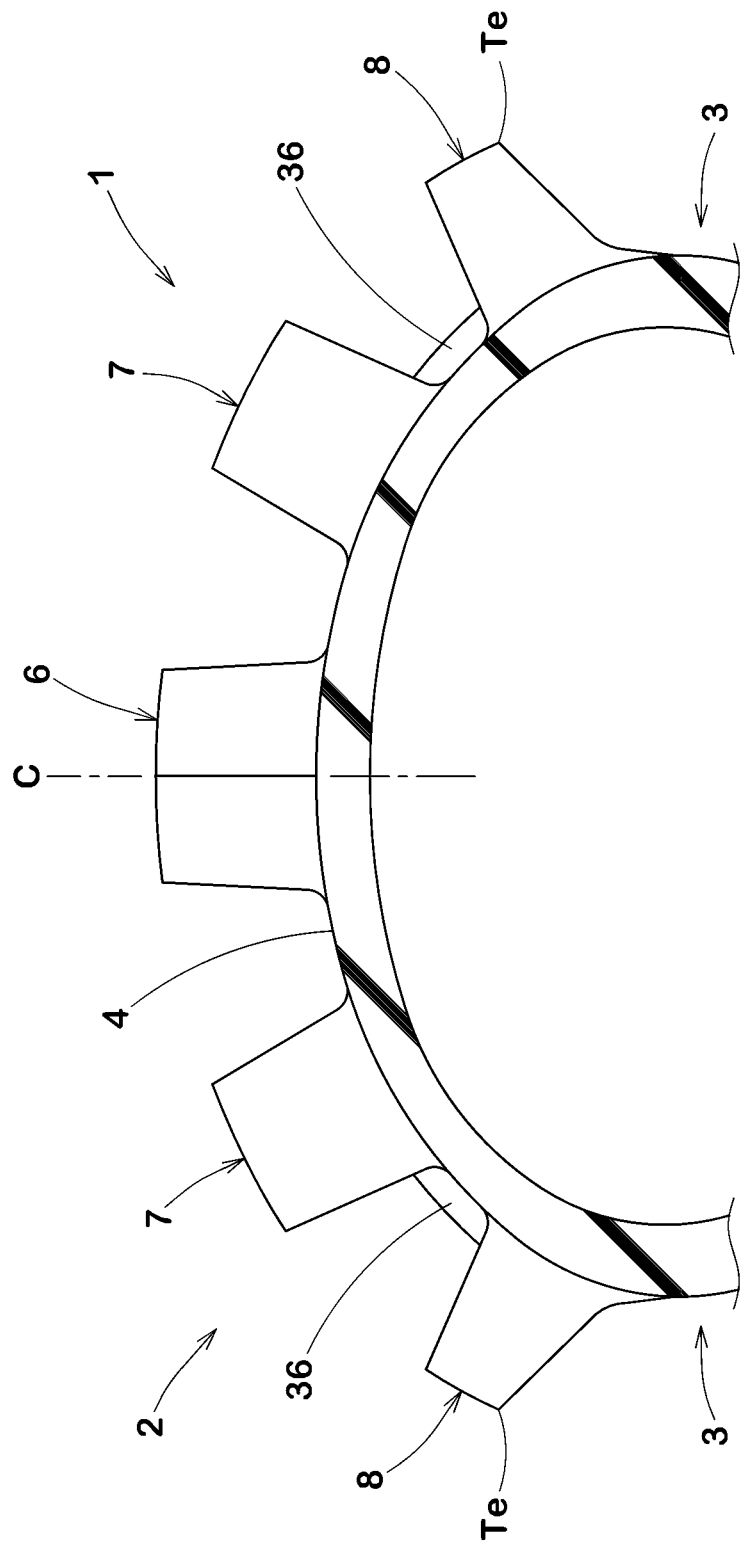
FIG. 1 is a cross-sectional view of a tread portion of a two-wheeled vehicle tire for running on rough terrain according to an embodiment.
Figure 2:
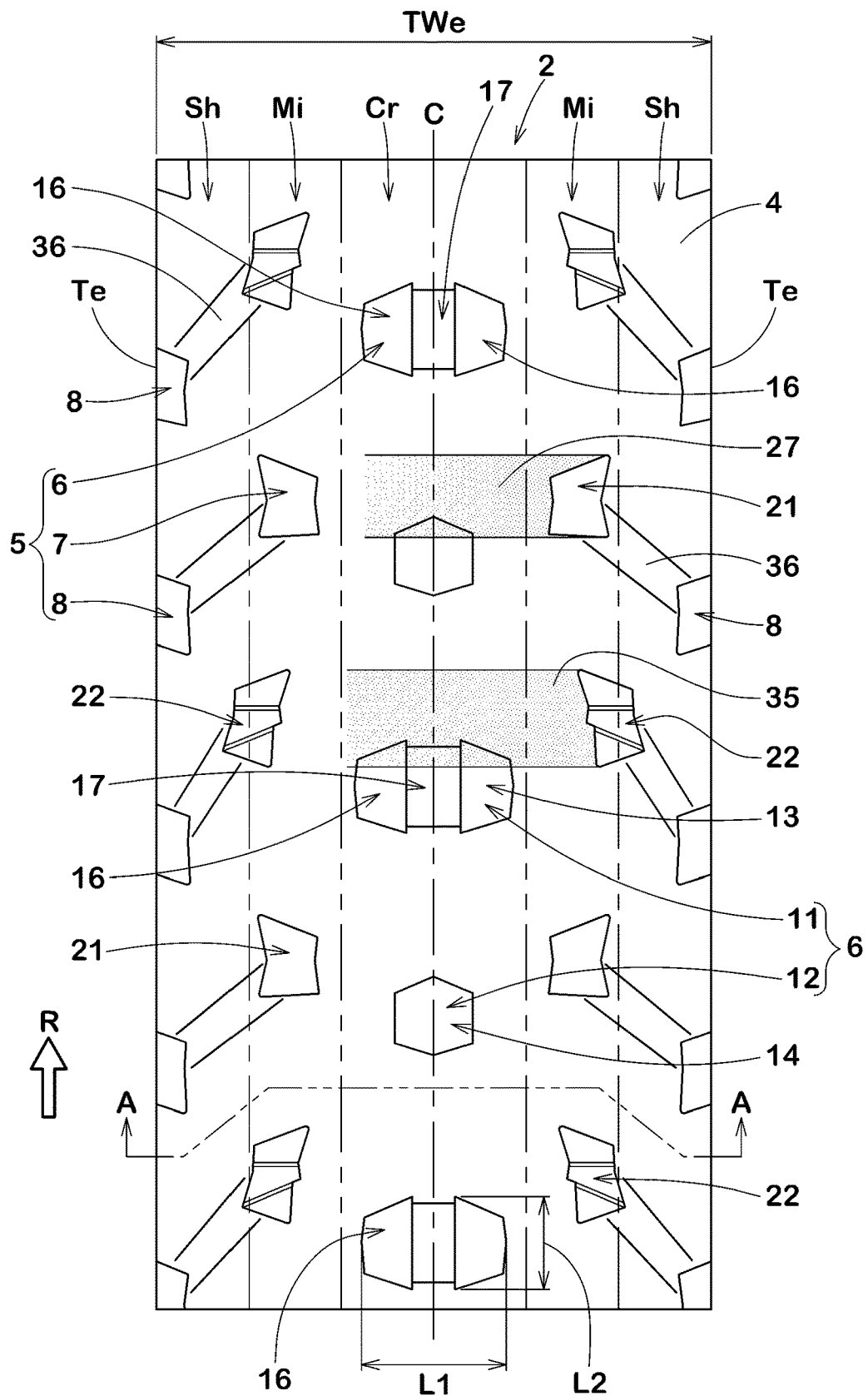
FIG. 2 is a development view of the tread portion in FIG. 1.

FIG. 1 illustrates a cross-sectional view of a tread portion 2 of a two-wheeled vehicle tire for running on rough terrain (hereinafter may simply be referred to as "tire") 1 of the present embodiment under the normal state. FIG. 2 is a development view of the tread portion 2 of the tire 1. FIG. 1 corresponds to the cross-sectional view taken along the line A-A in FIG. 2.

As used herein, when the tire 1 is a tire based on a standard, the "normal state" is such that the tire 1 is mounted onto a standard wheel rim with a standard pressure but loaded with no tire load. If the tire is not based on the standards, the normal state is a standard state of use according to the purpose of use of the tire and means a state of no load. As used herein, unless otherwise noted, dimensions of portions of the tire are values measured under the normal state.

As used herein, the "standard wheel rim" is a wheel rim officially approved for each tire by standards organizations on which the tire is based, wherein the standard wheel rim is the "standard rim" specified in JATMA, the "Design Rim" in TRA, and the "Measuring Rim" in ETRTO, for example.

As used herein, the "standard pressure" is a standard pressure officially approved for each tire by standards organizations on which the tire is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

As shown in FIG. 1, the tire 1 according to the present embodiment is suitable for use, for example, as a tire for motocross competitions. In particular, the tire 1 according to the present embodiment is suitable for use, for example, as a front tire of a motocross bike. However, the present disclosure is not limited to such an aspect. The tread portion 2 of the tire 1 according to the present embodiment is curved in a cross-sectional view in the form of an arc whose outer surface is convex outwardly in the tire radial direction.

The tire 1 according to the present embodiment, for example, includes a carcass and a tread reinforcing layer (not illustrated). These are made up of known components as appropriate.

As shown in FIG. 2, the tread portion 2 of the tire 1 according to the present disclosure has a directional pattern in which the rotation direction R is designated. The rotation direction R is indicated, for example, by letters or symbols on at least one of sidewall portions 3 (shown in FIG. 1). Alternatively, the present disclosure is not limited to such a manner. In some of the figures herein, the rotation direction R is indicated by arrows.

The tread portion 2, for example, includes a crown region Cr, a pair of middle regions Mi, and a pair of shoulder regions Sh.

The crown region Cr is the region having the width of ⅓ of the tread development width TWe, centered at the tire equator C. The shoulder regions Sh are the regions having the width of ⅙ of the tread development width TWe from the respective tread edges Te toward the tire equator C. The middle regions Mi are the regions between the crown region Cr and each of the shoulder regions Sh.

The tread development width TWe is the distance in the tire axial direction between the tread edges Te and Te when the tread portion 2 is developed on a plane. The tread edges Te mean the axially outer edges of the respective blocks positioned outermost in the tire axial direction among the blocks arranged in the tread portion 2.

The tread portion 2 includes a base surface 4 and a plurality of blocks 5 protruding outwardly in the tire radial direction from the base surface 4. Outer surfaces in the tire radial direction of the blocks 5 extend in parallel with the outer surface of the base surface 4. In the present embodiment, the blocks 5 include a plurality of crown blocks 6 on the tire equator C side, a plurality of shoulder blocks 8 on respective tread edge Te sides, and a plurality of middle blocks 7 arranged therebetween. The crown blocks 6 include outer surfaces in the tire radial direction (meaning the surfaces that come into contact with the ground when the tire is running on a plane, the same shall apply hereinafter) whose centroids of figures are located in the crown region Cr. The middle blocks 7 include radially outer surfaces whose centroids of figures are located in the middle regions Mi. The shoulder blocks 8 include radially outer surfaces whose centroids of figures are located in the shoulder regions Sh.

In the present disclosure, the plurality of middle blocks 7 provided in the tread portion 2 include at least one first middle block 21 and at least one second middle block 22, and the area of the outer surface of the second middle block 22 is larger than the area of the outer surface of the first middle block 21. Note that the area of the outer surface means the area in a state in which all recessed elements such as sipes and grooves provided on the outer surface are filled. In the present embodiment, a plurality of first middle blocks 21 and a plurality of second middle blocks 22 are alternately arranged in the tire circumferential direction.

Figure 3:
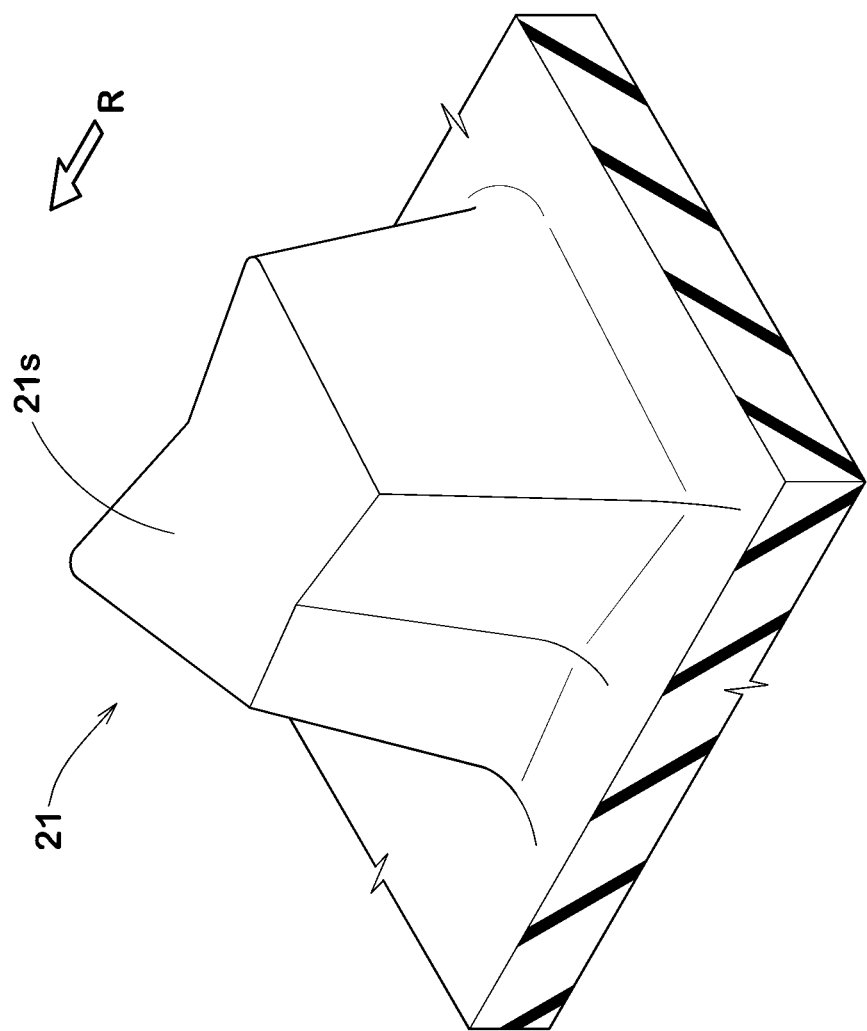
FIG. 3 is an enlarged perspective view of a first middle block of FIG. 2.
Figure 4:
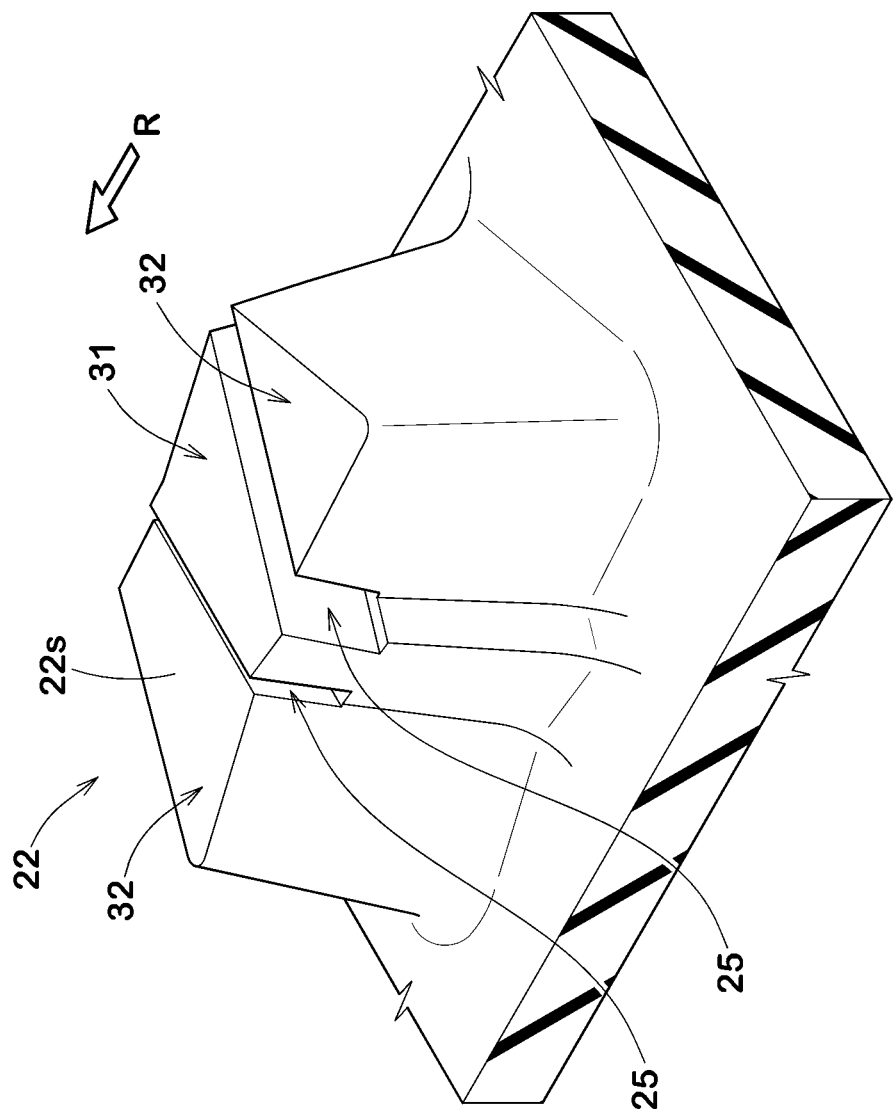
FIG. 4 is an enlarged perspective view of a second middle block in FIG. 2.
Figure 5:
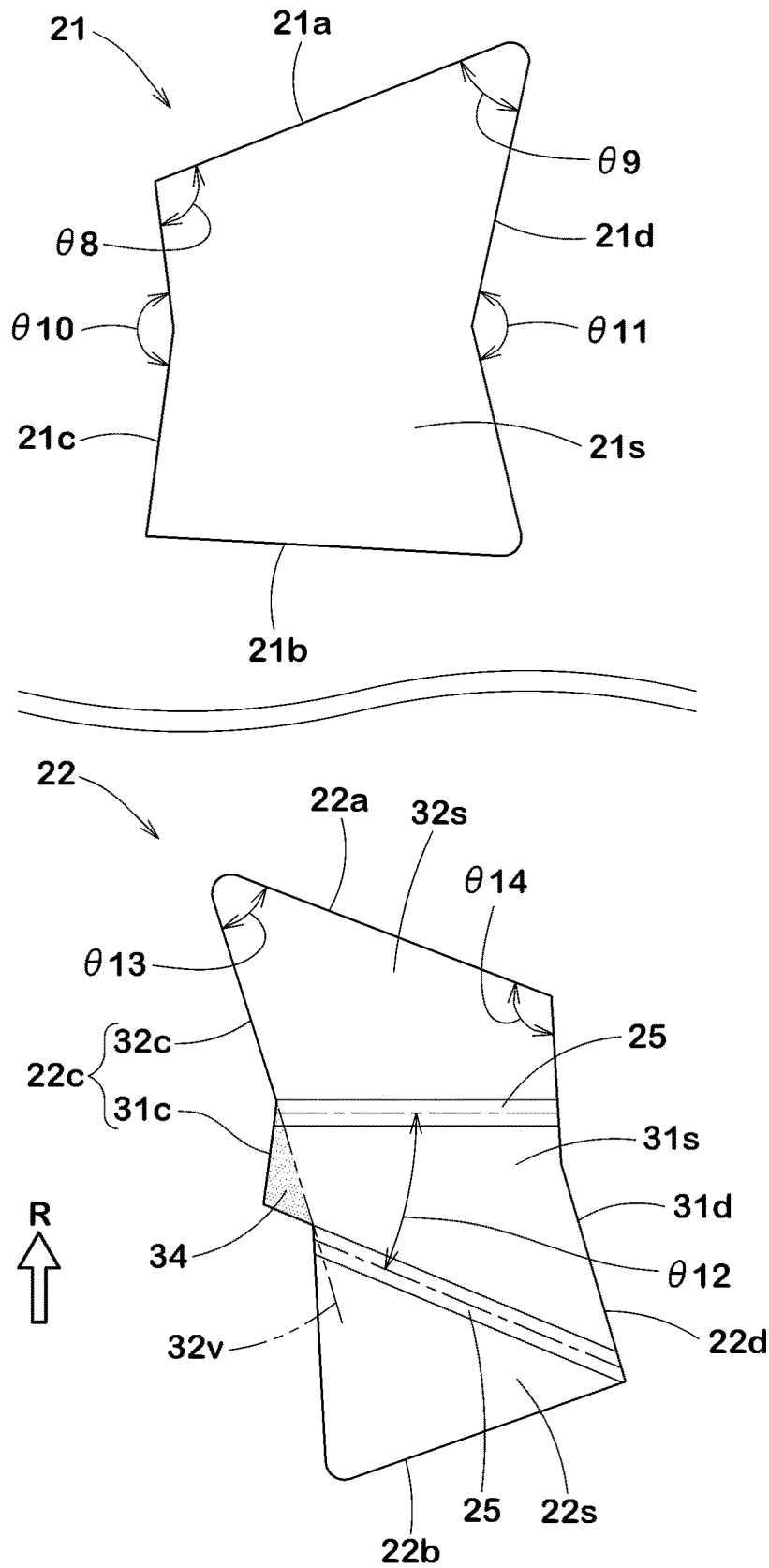

FIG. 3 illustrates an enlarged perspective view of one of the first middle blocks 21 in FIG. 2. FIG. 4 illustrates an enlarged perspective view of one of the second middle blocks 22 in FIG. 2. FIG. 5 is an enlarged plan view of one of the first middle blocks 21 and one of the second middle blocks 22 in FIG. 2. Note that a part of the area between the first middle block 21 and the second middle block 22 is omitted in FIG. 5. In addition, in this specification, the enlarged plan views showing the outer surfaces of the blocks, such as FIG. 5, mainly shows the outline of the outer surfaces of the blocks clearly, and the sidewall and root configurations of the blocks may be omitted even if they are observable in a block plan view.

As shown in FIGS. 3 to 5, in the present disclosure, the outer surface 21s of each first middle block 21 is not provided with any sipe, and the outer surface 22s of each second middle block 22 is provided with at least one sipe 25. In this specification, the term "sipe" refers to a cut having a narrow width, and the width between two inner walls facing each other is equal to or less than 1.5 mm.

By the above configuration, the tire 1 according to the present disclosure can exhibit stable slide controllability on both soft and hard road surfaces. The reasons for this are as follows. Note that in this specification, "hard road surfaces" refer to uneven road surfaces which are relatively strongly compacted, and "soft road surfaces" refer to uneven road surfaces which are relatively soft, such as muddy and sandy roads. Note that in this specification, "exhibit stable slide controllability" means that sudden sliding is difficult to occur and that the amount of sliding is easy to control, and that the above characteristics can be demonstrated without much influence from the road surfaces.

In the present invention, the absence of the sipes on the first middle blocks 21 can maintain the rigidity of the first middle blocks 21 and improve slide controllability on hard road surfaces, while the rigidity of the second middle blocks 22 can be relaxed by the sipes 25, improving slide controllability on soft road surfaces. Therefore, the tire 1 according to the present embodiment can exhibit stable sliding controllability on both soft and hard road surfaces.

Hereinafter, a more detailed configuration of the present embodiment will be described. Note that each configuration described below shows a specific aspect of the present embodiment. Hence, the present disclosure can exert the above-mentioned effects even if the tire does not include the configuration described below. In addition, if any one of the configurations described below is applied independently to the tire of the present disclosure having the above-mentioned characteristics, the performance improvement according to each additional configuration can be expected. Further, when some of the configurations described below are applied in combination, it is expected that the performance of the additional configurations will be improved.

As shown in FIG. 3, as a preferred aspect, each first middle block 21 is configured as a plain block with no recessed elements such as grooves or sipes on its outer surface 21s. Preferably, the area of the outer surface 21s of each first middle block 21 is equal to or more than 65% of the area of the outer surface 22s of each second middle block 22 (whose sipes 25 are filled). Thus, the grip performance on hard road surfaces can be improved.

As shown in FIG. 5, the outer surface 21s of each first middle block 21 includes a leading edge 21a, a trailing edge 21b, an inner longitudinal edge 21c, and an outer longitudinal edge 21d. The leading edge 21a extends in the tire axial direction on the leading side in the rotation direction R (hereinafter, simply referred to as "leading side"). The trailing edge 21b extends in the tire axial direction on the trailing side in the rotation direction R (hereinafter, simply referred to as "trailing side"). The inner longitudinal edge 21c extends in the tire circumferential direction from the end of the tire equator C side of the leading edge 21a to the trailing edge 21b. The outer longitudinal edge 21d extends from the end of the tread edge Te side of the leading edge 21a to the trailing edge 21b.

The leading edge 21a of each first middle block 21, for example, is inclined with respect to the tire axial direction. As a preferred embodiment, the leading edge 21a of each first middle block 21 is inclined toward the trailing side in the rotation direction R from the tread edge Te side (right side in FIG. 5) to the tire equator C side (left side in FIG. 5). Each first middle block 21 having such a leading edge 21a can guides mud, soil and the like to the crown region Cr (shown in FIG. 2) when running on soft road surfaces, thereby further improving braking performance.

As angle θ8 between the leading edge 21a and the inner longitudinal edge 21c is, for example, equal to or more than 80 degrees, preferably in the range from 90 to 110 degrees. Thus, the corner between the leading edge 21a and the inner longitudinal edge 21c can have high rigidity, improving slide controllability on hard road surfaces. On the other hand, an angle θ9 between the leading edge 21a and the outer longitudinal edge 21d is smaller than the angle θ8. For example, the angle θ9 is in the range from 50 to 70 degrees. This makes it easier for the corner between the leading edge 21a and the outer longitudinal edge 21d to be moderately deformed, so that the first middle blocks 21 can easily remove the mud and soil attached thereto when driving on soft road surfaces.

For example, in each first block 21, an angle of the trailing edge 21b with respect to the tire axial direction is smaller than an angle of the leading edge 21a with respect to the tire axial direction. Specifically, the angle of the trailing edge 21b with respect to the tire axial direction is equal to or less than 5 degrees. This allows the trailing edge 21b to provide a large friction force in the tire circumferential direction on soft road surfaces, improving braking performance.

In each first block 21, the inner longitudinal edge 21c is recessed toward the centroid of figure of the outer surface 21s by connecting two straight edges. Similarly, the outer longitudinal edge 21d is recessed toward the centroid of figure of the outer surface 21s by connecting two straight edges. As a result, the block sidewalls connected to the inner longitudinal edge 21c and the outer longitudinal edge 21d are recessed, so that these block sidewalls can push away dirt and mud on soft road surfaces and provide a large reaction force, improving cornering performance.

An angle θ10 between the two edges of the inner longitudinal edge 21c, for example, is in the range of from 160 to 170 degrees. An angle θ11 between the two edges of the outer longitudinal edge 21d, for example, is smaller than the angle θ10, and the angle θ11 is in the range from 150 to 160 degrees, for example. This makes it possible to demonstrate stable slide controllability in various road surface conditions.

As shown in FIG. 4 and FIG. 5, the outer surface 22s of each second middle block 22 is provided with a plurality of sipes 25 (e.g., two sipes). The sipes 25 traverse completely the outer surface 22s of the second middle block 22 in the tire axial direction.

As shown in FIG. 5, the sipes 25 extend straight. Additionally, the sipes 25 are arranged non-parallel to each other. In some preferred embodiment, a circumferential length of a part of block between the sipes 25 increases toward the tread edge Te side (right side in FIG. 5). An angle θ12 between the sipes 25, for example, is in the range from 10 to 30 degrees. Thus, in each second middle block 22, while the rigidity on the tread edge Te side can be improved, the rigidity on the tire equator C side (left side in FIG. 5) can be moderately deformable. This can prevent dirt and mud from clogging between the crown blocks 6 and the middle blocks 7.

Each sipe 25 includes a pair of sipe walls, and a width between the sipe walls is preferably in the range from 0.4 to 1.0 mm. In the present embodiment, the width of the sipes 25 is substantially constant in the depth direction of the sipe 25. However, a chamfer portion having a width of equal to or more than 1.5 mm may be provided on the opening of one or more sipes 25, and/or a flask bottom having a width of equal to or more than 1.5 mm may be provided with the bottom of one or more sipes 25.

As shown in FIG. 4, each second middle block 22 includes a first portion 31 sectioned between the sipes 25, and two second portions 32 located on both outer sides of the first portion 31. In addition, the first portion 31 and the second portions 32 have different heights. In this specification, the height of each part of a block means the distance in the normal direction from the imaginary bottom at the base of the block to the outer surface of each part passing through said imaginary bottom. The imaginary bottom is the bottom extending along the base surface 4 bounded by the ridge formed by the sidewalls of the block and the base surface 4 of the tread portion 2. If the outer surface of the block portion is non-parallel to the imaginary base, the height of the block means its maximum height.

In the present embodiment, the maximum height of the first portion 31 is greater than the maximum height of the second portions 32. In some preferred embodiments, the entire outer surface of the first portion 31 protrudes beyond the outer surfaces of the second portions 32. The difference between the maximum height of the first portion 31 and the maximum height of the second portions 32, for example, is equal to or less than 5.0 mm, preferably equal to or less than 3.0 mm. Thus, the first portion 31 can provide a large frictional force while suppressing uneven wear of the first portion 31. Note that the present disclosure is not limited to such an aspect, and for example, the maximum height of the second portions 32 may be greater than the maximum height of the first portion 31.

As shown in FIG. 5, the outer surface 31s of each first portion 31 includes an outer longitudinal edge 31d extending in the tire circumferential direction on the tread edge Te side and an inner longitudinal edge 31c extending in the tire circumferential direction on the tire equator C side. In each first portion 31, the actual length of the inner longitudinal edge 31c of each first portion 31 (the actual length is the length along the edge, hereafter the same) is smaller than the actual length of the outer longitudinal edge 31d. However, the actual length of the inner longitudinal edge 31c is preferably equal to or more than 2 mm. Specifically, the actual length of the inner longitudinal edge 31c is in the range from 30% to 60% of that of the outer longitudinal edge 31d. As a result, excellent grip performance can be exhibited on soft and hard road surfaces. Note that the inner longitudinal edge 31c does not include the edge extending along the sipes 25.

In a plan view of the outer surface 22s of each second middle block 22, it is preferable that the outer surface 31s of the first portion 31 includes a projection 34 (dotted in FIG. 5) that projects outwardly in the block-width direction from the virtual extensions 32v of the longitudinal edge 32c of the outer surface 32s of the second portions 32. Such a protrusion 34 can provide multi-directional friction force on soft road surfaces and can remove mud and soil from between blocks of the tread portion 2. Note that the protrusion 34 means the area protruding outward in the block-width direction from the virtual extension lines 32v of both of two second portions 32.

The protrusion 34 is preferably arranged on the tire equator C side. In addition, an area of the protrusion 34, for example, is equal to or less than 50% of the entire area of the outer surface 31s of the first portion 31, preferably equal to or less than 30%. This can suppress uneven wear of the protrusion 34 while achieving the above-mentioned effect.

Preferably, each of the second portions 32 has a length in the tire circumferential direction decreasing toward the tread edge Te side. This can improve the slide controllability further.

The outer surface 22s of each second middle block 22 includes a leading edge 22a, a trailing edge 22b, an inner longitudinal edge 22c, and an outer longitudinal edge 22d. The leading edge 22a extends in the tire axial direction on the leading side in the rotation direction R. The trailing edge 22b extends in the tire axial direction on the trailing side. The inner longitudinal edge 22c extends in the tire circumferential direction from the end on the tire equator C side of the leading edge 22a to the trailing edge 22b. The outer longitudinal edge 22d extends in the tire circumferential direction from end on the tread edge Te side of the leading edge 22a to the trailing edge 22b.

In each second middle block 22, the leading edge 22a, for example, is inclined with respect to the tire axial direction. In some preferred embodiments, the leading edge 22a of the second middle block 22 is inclined toward the trailing side in the rotation direction R from the tire equator C side to the tread edge Te side (right side in FIG. 5). In other words, the leading edge 22a of each second middle block 22 is inclined in the opposite direction with respect to the tire axial direction to the leading edge 21a of each first middle block 21. As a result, the middle blocks can provide frictional force in multiple directions, demonstrating excellent braking performance.

In each second middle block 22, an angle θ13 between the leading edge 22a and the inner longitudinal edge 22c is, for example, in the range from 50 to 60 degrees. In some preferred embodiments, the angle θ8 between the leading edge 21a and the inner longitudinal edge 21c of each first middle block 21 is greater than the angle θ13 between the leading edge 22a and the inner longitudinal edge 22c of each second middle block 22. This can improve slide controllability on various road surfaces further.

An angle θ14 between the leading edge 22a and the outer longitudinal edge 22d of each second middle block 22 is, for example, in the range from 100 to 120 degrees. Thus, the corner between the leading edge 22a and the outer longitudinal edge 22d has high rigidity, improving slide controllability on hard road surfaces.

The trailing edge 22b of each second middle block 22, for example, is inclined in the opposite direction with respect to the tire axial direction to the leading edge 22a of each second middle block 22. In some preferred embodiments, an angle of the trailing edge 22b of each second middle block 22 with respect to the tire axial direction is greater than an angle of the trailing edge 21b of the first middle block 21 with respect to the tire axial direction. As a result, the first middle blocks 21 and the second middle blocks 22 have different rigidity in the tire circumferential direction, improving slide control performance on various road surfaces.

The inner longitudinal edge 22c of each second middle block 22 extends in a zigzag manner due to longitudinal edges of the first portion 31 and the second portions 32. In addition, the outer longitudinal edge 22d of each second middle block 22 is recessed toward the centroid of figure of the outer surface 22s by connecting two straight edges. This can provide excellent cornering performance.

As shown in FIG. 2, in the present disclosure, the tread portion 2 includes a plurality of first blocks 11 and a plurality of second blocks 12 which are arranged alternately in the tire circumferential direction. In the present embodiment, the first blocks 11 and the second blocks 12 are configured as the crown blocks 6 located in the crown region Cr. Hereinafter, the first blocks 11 may be referred to as first crown blocks 13, and the second blocks 12 may be referred to as second crown blocks 14. However, in the present invention, the arrangement of the first blocks 11 and the second blocks 12 are not limited to the above aspect.

It is preferable that the first blocks 11 (the first crown blocks 13) are adjacent to the respective second middle blocks 22. Specifically, in a plan view of the tread portion 2, the respective virtual areas 35 in which the second middle blocks 22 are expanded parallel to the tire axial direction preferably overlap the respective first blocks 13 (the first crown blocks 13) at least partially. In addition, it is preferable that the second blocks 12 (the second crown blocks 14) are adjacent to the respective the first middle blocks 21. Specifically, in a plan view of the tread portion 2, the respective virtual areas 27 in which the first middle blocks 21 are expanded parallel to the tire axial direction preferably overlap the respective second blocks 12 (the second crown blocks 14) at least partially.

Figure 6:
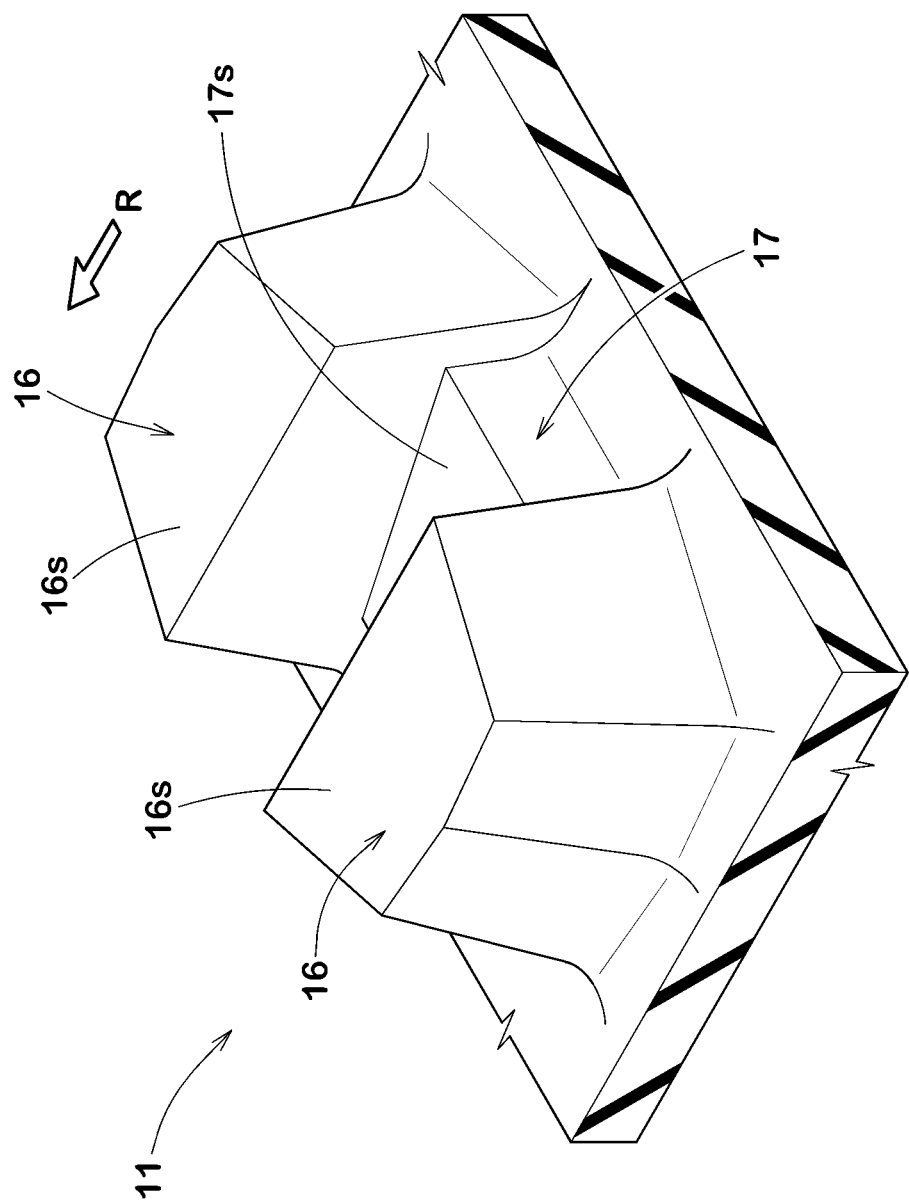
FIG. 6 is an enlarged perspective view of a first block in FIG. 2.
Figure 7:
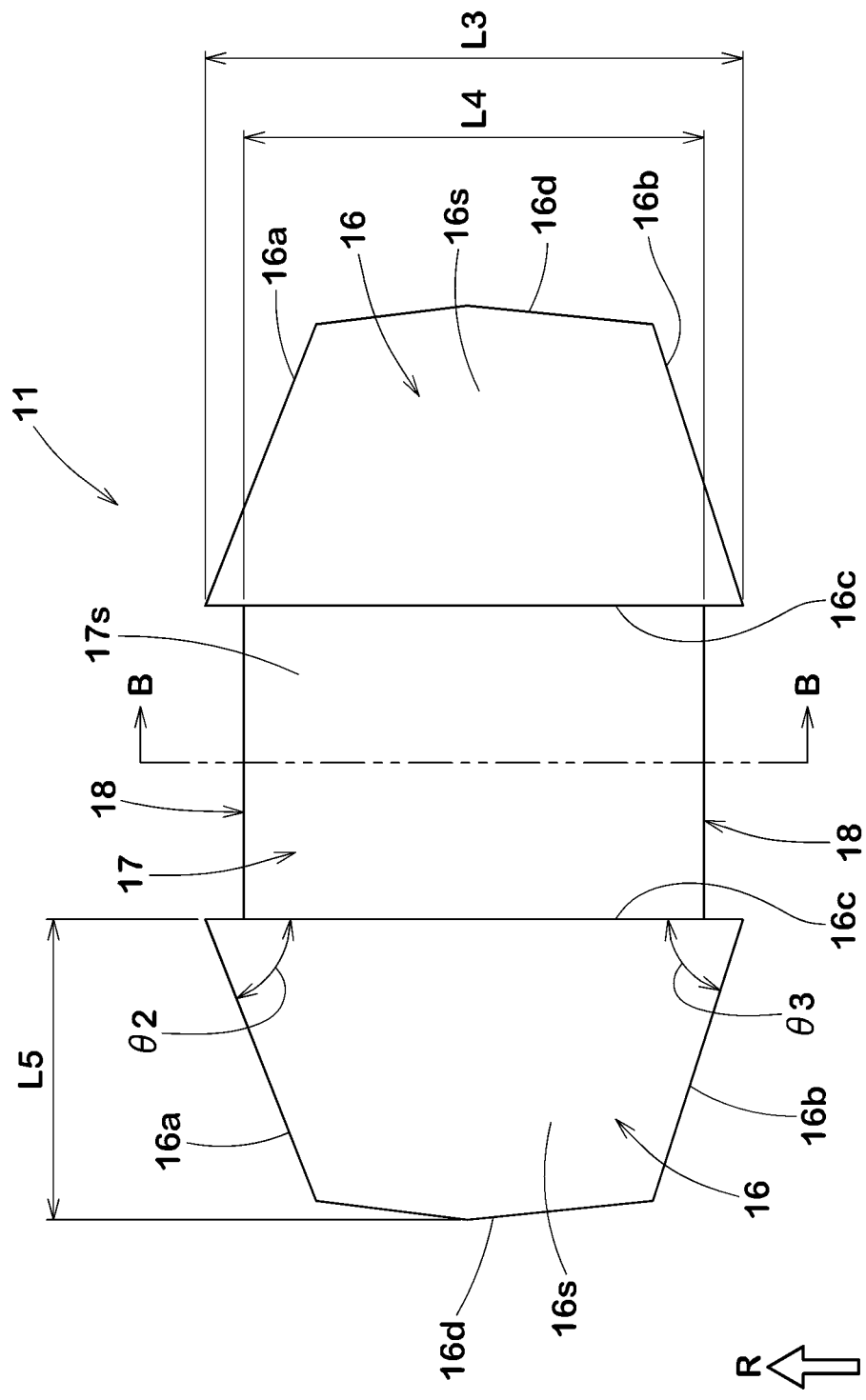
FIG. 7 is an enlarged plan view of a first block in FIG. 2.

FIG. 6 illustrates an enlarged perspective view of one of the first blocks 11, and FIG. 7 illustrates an enlarged plan view of the first block 11. As shown in FIG. 6 and FIG. 7, each first block 11 includes a pair of block pieces 16 adjacent to each other in the tire axial direction, and a tie-bar 17 connecting the pair of block pieces 16.

Figure 8:
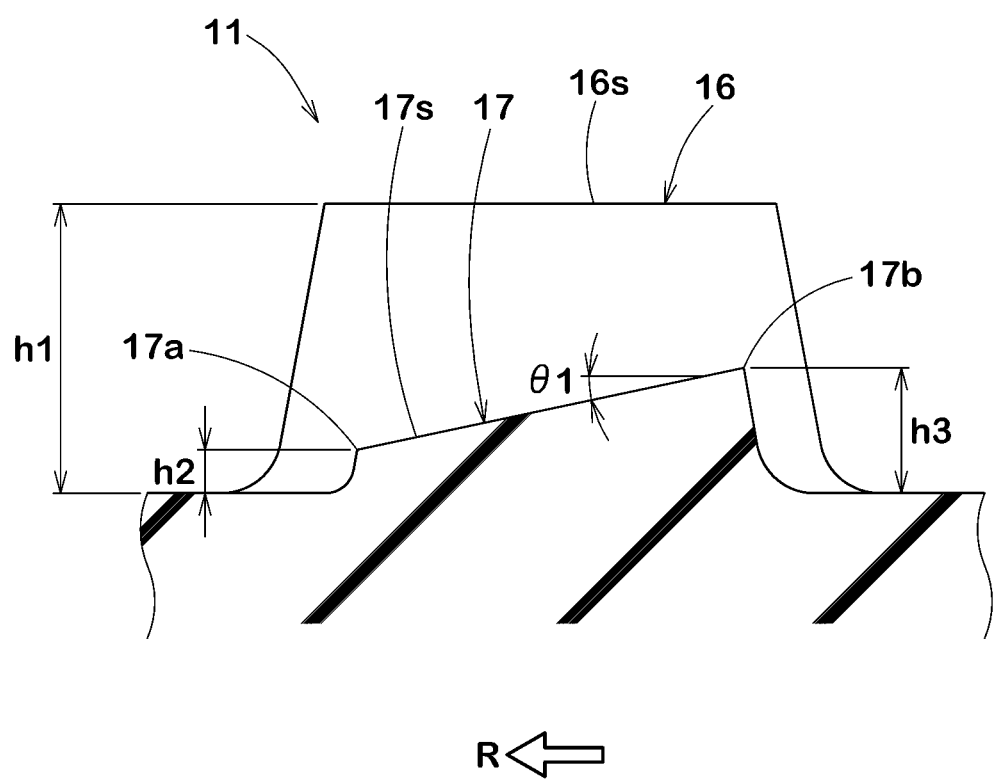
FIG. 8 is a cross-sectional view taken along the line B-B in FIG. 7.

FIG. 8 illustrates a cross-sectional view taken along the line B-B of FIG. 7. As shown in FIG. 8, the outer surface 17s of the tie-bar 17 has a height increasing toward the trailing side in the rotation direction R (hereinafter, simply referred to as "trailing side"). In addition, as shown in FIG. 7, the outer surface 16s of each block piece 16 has an axially extending leading edge 16a located on the leading side in the rotation direction R which comes into contact with the ground prior to the trailing edge 16b when the tire rotates in the rotation direction R. The leading edge 16a of each of the pair of block pieces 16 is inclined toward the trailing side in the rotation direction R from the end on the tie-bar side thereof outwardly in the block-width direction.

The first blocks 11 according to the present embodiment have high rigidity due to the tie-bars 17 and can maintain running performance on hard road surfaces. In addition, in the present disclosure, since the tie-bars 17 and the leading edges 16a of the block pieces have the above configuration, the leading edges 16a of the first blocks 11 and the tie-bars 17 can bite the ground more easily when driving on soft road surfaces, providing excellent grip and steering characteristics. For the above reasons, the tire 1 according to the present embodiment can exhibit excellent grip and steering characteristics on soft road surfaces while maintaining running performance on hard road surfaces.

As shown in FIG. 2, the first blocks 11, for example, are located on the tire equator C. In some more preferred embodiments, the tie-bars 17 of the first blocks 11 are located on the tire equator C. In addition, each first block 11 is arranged such that the pair of the block pieces 16 is lineally symmetric with respect to the tire equator C in a plan view of its outer surface. Thus, the configuration of one of the block pieces 16 described below can be applied to each of the pair of block pieces 16. However, the present disclosure is not limited to such a configuration.

Preferably, the maximum length L1 in the tire axial direction of the outer surface of each first block 11 is in the range from 20% to 30% of the tread development width TWe. In addition, the maximum length L2 in the tire circumferential direction of the outer surface of each first block 11 is, for example, in the range from 55% to 75% of the length L1.

As shown in FIG. 6 and FIG. 7, it is preferable that the outer surface 17s of each tie-bar 17 has a smooth and flat shape. In another embodiment of the disclosure, the outer surface 17s of each or at least one tie-bar 17 may include an uneven surface. In some preferred embodiments, the outer surface 17s of each tie-bar 17, in a plan view, has a rectangular shape bounded by two lateral edges parallel to the tire axial direction and two longitudinal edges parallel to the tire circumferential direction.

As shown in FIG. 7, the maximum length L4 in the tire circumferential direction of the outer surface 17s of each tie-bar 17 is preferably in the range from 40% to 100%, more preferably 70% to 90%, of the maximum length L3 in the tire circumferential direction of the outer surface 16s of the block pieces 16. When the length L4 of each tie-bar 17 is smaller than the length L3 of the block pieces 16, a recess 18 can preferably be formed by the tie-bar 17 at least on the sidewall of each first block 11 on the leading-edge side in the rotation direction R. In other words, the sidewall of the tie-bar 17 may be smoothly continuous with the sidewall of the block pieces 16 on the trailing edge side in the rotation direction R of the first block 11. In the present embodiment, as a preferred aspect, the recesses 18 are formed by the tie-bar 17 on both sidewalls of each first block 11 on the leading and trailing sides in the rotation direction R. This allows each first block 11 to provide a large grip in each direction of the tire circumferential direction.

As shown in FIG. 8, the maximum angle θ1 of the outer surface 17s of each tie-bar 17 with respect to the tire circumferential direction is, for example, in the range from 2 to 60 degrees. The angle θ1 is preferably equal to or more than 5 degrees, more preferably equal to or more than 10 degrees, but preferably equal to or less than 40 degrees, more preferably equal to or less than 20 degrees. Such a tie-bar 17 can improve grip on both soft road surfaces and hard road surfaces in a well-balanced manner. In the present embodiment, the outer surface 17s of each tie-bar 17 is configured such that the substantially entire surface is at the angle θ1 described above with respect to the tire circumferential direction. In addition, in the present embodiment, the contour line formed by the outer surface 17s of the tie-bar 17 of each first block 11 is parallel to the contour line formed by the outer surface 16s of the block pieces 16 in a cross-sectional view that is orthogonal to the outer surface 16s of the block pieces 16 and is parallel to the tire axial direction (not shown).

In each first block 11, the height h2 at the end 17a on the leading side of the outer surface 17s of the tie-bar 17 is, for example, in the range from 10% to 60% of the maximum height h1 of the outer surface 16s of the block pieces 16. The height h2 of the tie-bar 17 is preferably equal to or less than 40% of the height h1 of the block pieces 16, more preferably equal to or less than 20%. In addition, in each first block 11, the height h3 at the end 17b on the trailing side of the outer surface 17s of the tie-bar 17 is, for example, in the range from 20% to 70%, more preferably from 35% to 50%, of the maximum height h1 of the outer surface 16s of the block pieces 16.

The configuration of each tie-bar 17 is not limited to the embodiments described above. In another embodiment of the disclosure, the height h3 at the end 17b on the trailing side of the outer surface 17s of the tie-bar 17 may be the same as the height h1 of the outer surface 16s of the block pieces 16. Such a tie-bar 17 can increase the rigidity of each first block 11, and can improve grip performance and steering characteristics on hard road surfaces.

As shown in FIG. 7, in each first block 11, the maximum length L3 in the tire circumferential direction of the outer surface 16s of the block pieces 16 is the same as the maximum length L2 (shown in FIG. 2) in the tire circumferential direction of the outer surface of the first block 11. In addition, a length L5 in the tire axial direction of the outer surface 16s of each block piece 16 is, for example, in the range from 25% to 40% of the maximum length L1 in the tire axial direction of the outer surface of the first block 11.

The outer surface 16s of each block piece 16 is surrounded by the leading edge 16a, the trailing edge 16b, a circumferentially extending inner longitudinal edge 16c on the tie-bar 17 side, and a circumferentially extending outer edge 16d on the tread edge Te side. As a result, the outer surface 16s of each block piece 16 has a pentagonal shape.

In the present embodiment, the leading edge 16a, for example, extends straight. In another embodiment, the leading edge 16a may extend in an arc-shape that is concave toward the center of figure of the outer surface 16s of each block piece 16, as indicated by the two-dot chain line in FIG. 7. In such an embodiment, the corners of the block pieces 16 can easily bite road surfaces, improving grip performance further on soft road surfaces.

An angle θ2 of the leading edge 16a of each block piece 16 is, for example, equal to or more than 20 degrees with respect to the tire circumferential direction, preferably equal to or more than 30 degrees, more preferably equal to or more than 60 degrees. In addition, the angle θ2 is preferably equal to or less than 80 degrees. Such a leading edge 16a can improve grip performance on soft road surfaces while suppressing uneven wear of the block piece 16.

In the present embodiment, the trailing edge 16b of each of the block pieces 16 is inclined toward the leading side in the rotation direction R from an end on the tie-bar side thereof outwardly in the block-width direction. The block pieces 16 with these trailing edges 16b can bite the ground more easily and help to further improve the steering characteristics on soft and hard road surfaces.

The trailing edge 16b of each of the block pieces 16, for example, extends straight. In another embodiment, the trailing edge 16b may extend in an arc-shape that is concave toward the center of figure of the outer surface 16s of each block piece 16, as indicated by the two-dot chain line in FIG. 7. Such an embodiment can further improve the grip performance and steering characteristics on soft road surfaces.

The maximum angle θ3 with respect to the tire circumferential direction of the trailing edge 16b of each block piece 16, for example, is equal to or more than 20 degrees, preferably equal to or more than 30 degrees, more preferably equal to or more than 60 degrees. In some preferred embodiments, the angle θ3 of the trailing edge 16b is preferably greater than the angle θ2 of the leading edges 16a with respect to the tire circumferential direction. The difference between the angles θ2 and θ3 is, for example, equal to or less than 10 degrees, preferably equal to or less than 5 degrees. This can improve the steering and gripping performance on soft and hard road surfaces while suppressing uneven wear of the block pieces 16.

The inner longitudinal edge 16c of each block piece 16, for example, extends straight in parallel with the tire circumferential direction. On the other hand, the outer longitudinal edge 16d of each block piece 16 is preferably bent to protrude toward the tread edge Te. For example, the outer longitudinal edge 16d includes two edges inclined in opposite directions with respect to the tire circumferential direction and these edges extend at an angle of equal to or less than 10 degrees with respect to the tire circumferential direction. Such an outer longitudinal edge 16d can help to enhance steering performance.

Figure 9:
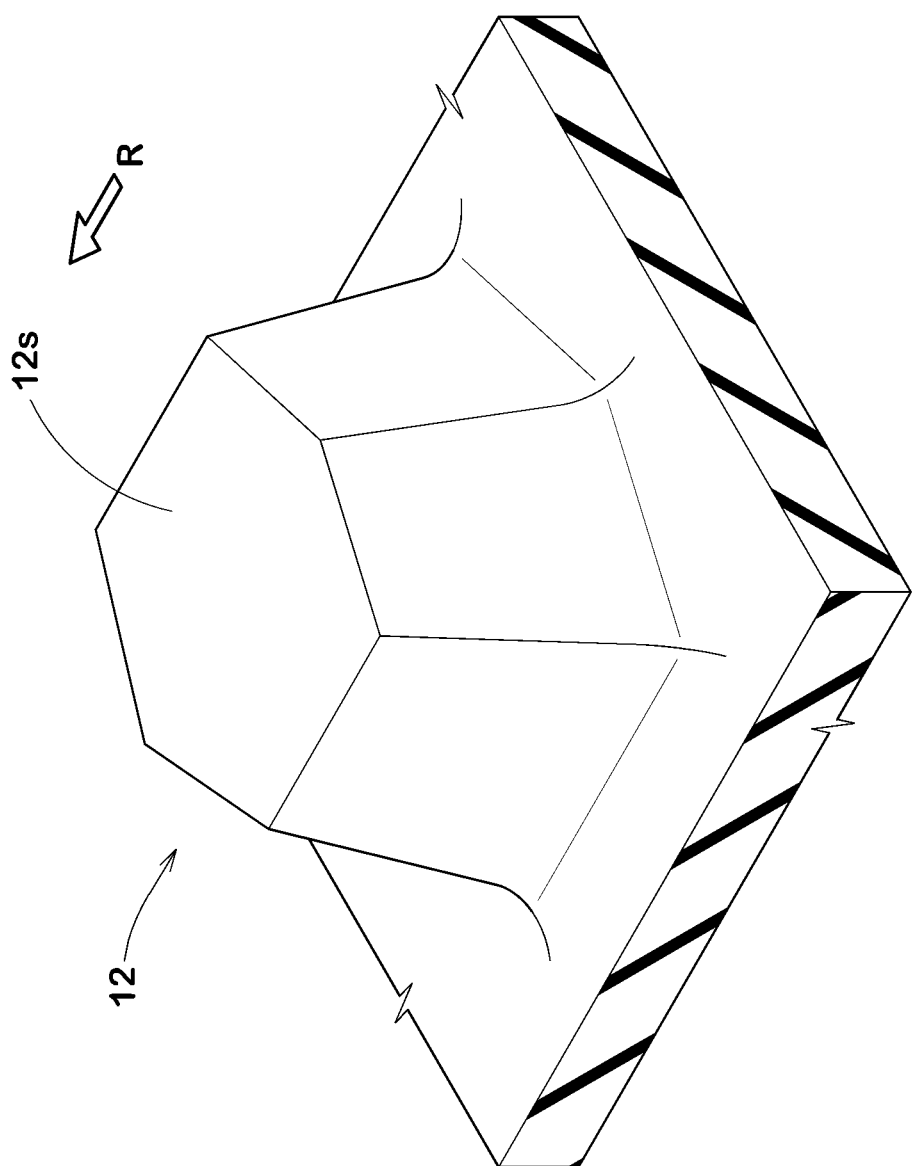
FIG. 9 is an enlarged perspective view of a second block in FIG. 2.
Figure 10:
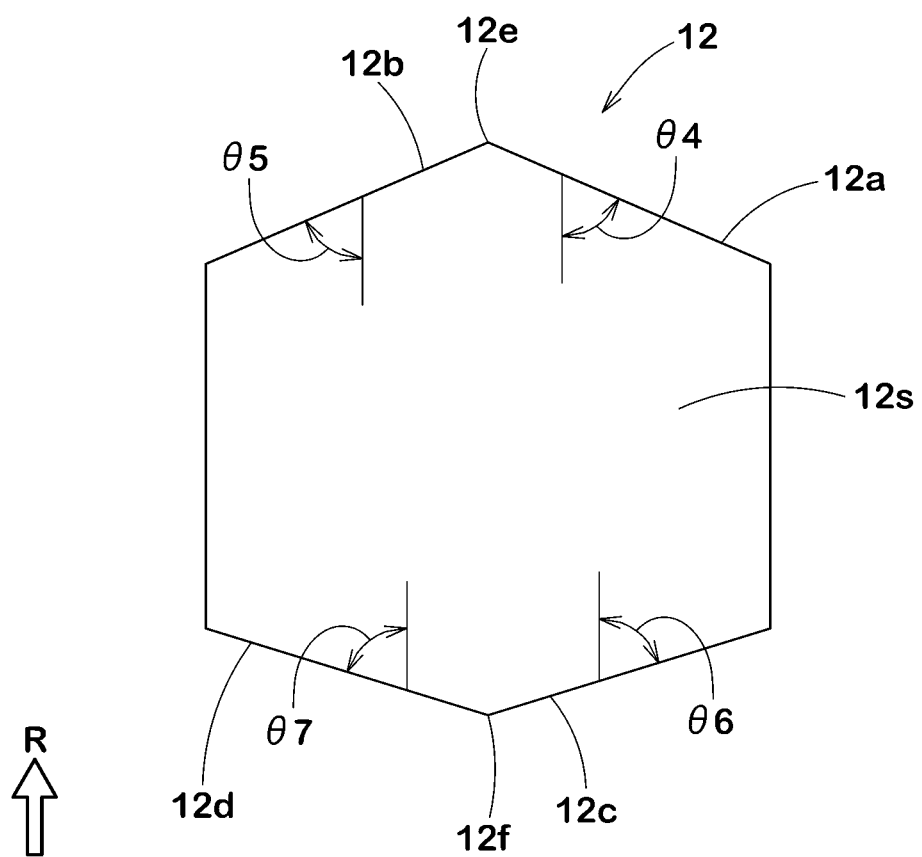
FIG. 10 is an enlarged plan view of a second block in FIG. 2.

FIG. 9 illustrates an enlarged perspective view of one of the second blocks 12, and FIG. 10 illustrates an enlarged plan view the second block 12. As shown in FIG. 9 and FIG. 10, the outer surface 12s of each second block 12 has a hexagonal shape. The area of the outer surface 12s of each second block 12 is preferably smaller than the sum of the areas of the outer surfaces 16s of the block pieces 16 of each first block 11. Such a second block 12 can bite the ground easily even on hard road surfaces, and can enhance grip and steering characteristics on hard road surfaces.

Each second block 12 is configured as a plain block with no recessed elements such as grooves or sipes on its outer surface 12s.

As shown in FIG. 10, the outer surface 12s of each second block 12 includes a leading end 12e on the leading side in the rotation direction R, a first edge 12a extending to one side in the tire axial direction from the leading end 12e, and a second edge 12b extending to the other side in the tire axial direction from the leading end 12e. In addition, each of the first edge 12a and the second edge 12b are inclined from the leading end 12e outwardly in the block-width direction toward the trailing side in the rotational direction R. An angle θ4 of the first edge 12a with respect to the tire circumferential direction and an angle θ5 of the second edge 12b with respect to the tire circumferential direction, for example, are in the range from 50 to 80 degrees, preferably from 60 to 70 degrees. Thus, the second blocks 12 can provide a well-balanced grip force in the tire circumferential direction and tire axial direction.

Similarly, the outer surface 12s of each second block 12 includes a trailing end 12f on the trailing side in the rotation direction R, a third edge 12c extending to one side in the tire axial direction from the trailing end 12f, and a fourth edge 12d extending to the other side in the tire axial direction from the trailing end 12f. In addition, each of the third edge 12c and the fourth edge 12d are inclined from the trailing end 12f outwardly in the block-width direction toward the leading side in the rotational direction R. An angle θ6 of the third edge 12c with respect to the tire circumferential direction and an angle θ7 of the fourth edge 12d with respect to the tire circumferential direction, for example, are in the range from 60 to 85 degrees, preferably from 70 to 80 degrees.

In the present embodiment, the first edge 12a and the second edge 12b extend straight. In addition, the third edge 12c and the fourth edge 12d extend straight. In another embodiment, each of the first edge 12a and the second edge 12b may extend in an arc-shape that is concave toward the center of figure of the outer surface 12s of the second block 12. Similarly, each of the third edge 12c and the fourth edge 12d may extend in an arc-shape that is concave toward the center of figure of the outer surface 12s of the second block 12. In such an embodiment, each second block 12 can bite the ground more easily on soft road surfaces, and grip performance and steering characteristics on soft road surfaces can be improved further.

As shown in FIG. 2, in the present embodiment, the first blocks 11 described above are configured as the first crown blocks 13 provided in the crown region Cr, and the second blocks 12 described above are configured as the second crown blocks 14 provided in the crown region Cr. In such an embodiment, these blocks can provide a large grip force in the tire circumferential direction when driving straight and when turning at relatively small camber angles, and can exhibit excellent braking performance.

As shown in FIG. 1 and FIG. 2, the tread portion 2 includes at least one shoulder block 8 that is located on the tread edge Te side with respect to the middle blocks 7, and a shoulder tie-bar 36 that connects the shoulder block 8 with one of the middle blocks 7. In some preferred embodiments, a plurality of shoulder blocks 8 are arranged in the tire circumferential direction, and the shoulder blocks 8 are connected with the respective middle blocks 7 by the shoulder tie-bars 36. These shoulder blocks 8 and shoulder tie-bars 36 can further improve grip performance in the tire circumferential direction.

As shown in an enlarged perspective view of a block (for example, FIG. 3), the block sidewalls of each block extend in a block height direction such that their generating lines have the same characteristics as the edges of the outer surface of the block.

As shown in FIG. 1, the tread portion 2 has a tread rubber that constitutes the tread portion 2, and the tread rubber has a rubber hardness in the range from 45 to 90 degrees, for example. The rubber hardness is defined based on JIS-K6253 and measured by durometer type A under an environment of 23 degrees C.

Although one or more preferred embodiments of the two-wheeled vehicle tire for running on rough terrain according to the present disclosure have been described in detail above, the present disclosure is not limited to the specific embodiments described above, and can be implemented in various aspects.

Additional Note

The present disclosure includes the following aspects.
[Disclosure 1]
A two-wheeled vehicle tire for running on rough terrain, the tire comprising a tread portion, wherein
the tread portion comprises a plurality of middle blocks located between a tire equator and a tread edge,
the plurality of middle blocks comprises at least one first middle block having an outer surface in a tire radial direction, and at least one second middle block having an outer surface in the tire radial direction whose area is larger than an area of the outer surface of the at least one first middle block,
the outer surface in the tire radial direction of the at least one first middle block is not provided with sipes, and
the outer surface of the at least one second middle block is provided with at least one sipe.
[Disclosure 2]
The two-wheeled vehicle tire for running on rough terrain according to disclosure 1, wherein
the at least one sipe comprises two sipes that completely traverse the outer surface of the at least one second middle block in a tire axial direction.
[Disclosure 3]
The two-wheeled vehicle tire for running on rough terrain according to disclosure 2, wherein
the at least one second middle block comprises a first portion sectioned between the sipes, and two second portions located on both outer sides of the first portion, and
the first portion and the second portions have different heights.
[Disclosure 4]
The two-wheeled vehicle tire for running on rough terrain according to disclosure 3, wherein
a maximum height of the first portion is greater than a maximum height of the second portions.
[Disclosure 5]
The two-wheeled vehicle tire for running on rough terrain according to disclosure 3 or 4, wherein
an outer surface in the tire radial direction of the first portion comprises an outer longitudinal edge extending in a tire circumferential direction on a tread edge side and an inner longitudinal edge extending in the tire circumferential direction on a tire equator side, and
an actual length of the inner longitudinal edge is smaller than an actual length of the outer longitudinal edge.

[Disclosure 6]

The two-wheeled vehicle tire for running on rough terrain according to disclosure 5, wherein
the actual length of the inner longitudinal edge is equal to or more than 2 mm.

[Disclosure 7]

The two-wheeled vehicle tire for running on rough terrain according to any one of disclosures 3 to 6, wherein
outer surfaces in the tire radial direction of the second portions comprise longitudinal edges extending straight in a tire circumferential direction on a tire equator side or a tread edge side, and
in a plan view of the outer surface of the at least one second middle block, the outer surface in the tire radial direction of the first portion comprises a projection that projects outwardly in a block-width direction from respective virtual extensions of the longitudinal edges of the outer surfaces of the second portions.

[Disclosure 8]

The two-wheeled vehicle tire for running on rough terrain according to disclosure 7, wherein
an area of the protrusion is equal to or less than 50% of an entire area of the outer surface of the first portion.

[Disclosure 9]

The two-wheeled vehicle tire for running on rough terrain according to any one of disclosures 1 to 8, wherein
an area of the outer surface of the at least one first middle block is equal to or more than 65% of an area of the outer surface of the at least one second middle block.

[Disclosure 10]

The two-wheeled vehicle tire for running on rough terrain according to any one of disclosures 1 to 9, wherein
the tread portion has a designated rotation direction,
each of the outer surface of the at least one first middle block and the outer surface of the at least one second middle block comprises an axially extending leading edge located on a leading side in the rotation direction and an inner longitudinal edge extending in a tire circumferential direction from an end of a tire equator side of the leading edge, and
an angle between the leading edge and the inner longitudinal edge of the at least one first middle block is greater than an angle between the leading edge and the inner longitudinal edge of the at least one second middle block.

[Disclosure 11]

The two-wheeled vehicle tire for running on rough terrain according to any one of disclosures 1 to 10, wherein
the tread portion further comprises at least one shoulder block located on a tread edge side with respect to the plurality of middle blocks, and a shoulder tie-bar that connects the at least one shoulder block with one of the plurality of middle blocks.

The invention claimed is:

1. A two-wheeled vehicle tire for running on rough terrain, comprising:
   a tread portion provided with middle blocks located between a tire equator and a tread edge,
   the middle blocks including
      a first middle block whose radially outer surface is not provided with sipes, and
      a second middle block whose radially outer surface is provided with at least one sipe,
   wherein
      the tread portion has a designated rotation direction,
      each of the radially outer surface of the first middle block and the radially outer surface of the second middle block has an axially extending leading edge located on a leading side in the designated rotation direction and an inner longitudinal edge extending in a tire circumferential direction from an end of a tire equator side of the leading edge, and
      an angle between the leading edge and the inner longitudinal edge of the first middle block is greater than an angle between the leading edge and the inner longitudinal edge of the second middle block.

2. The two-wheeled vehicle tire for running on rough terrain according to claim 1, wherein
   the angle between the leading edge and the inner longitudinal edge of the first middle block ranges from 90 to 110 degrees, and
   the angle between the leading edge and the inner longitudinal edge of the second middle block ranges from 50 to 60 degrees.

3. The two-wheeled vehicle tire for running on rough terrain according to claim 1, wherein
   the inner longitudinal edge of the first middle block includes two straight edges, and
   the straight edges are connected such that the inner longitudinal edge is recessed toward the centroid of figure of the radially outer surface of the first middle block.

4. The two-wheeled vehicle tire for running on rough terrain according to claim 3, wherein an angle between the straight edges of the inner longitudinal edge of the first middle block ranges from 160 to 170 degrees.

5. The two-wheeled vehicle tire for running on rough terrain according to claim 3, wherein
   the radially outer surface of the first middle block has an outer longitudinal edge extending in the tire circumferential direction from an end on a tread edge side of the leading edge,
   the outer longitudinal edge of the first middle block includes two straight edges,
   the straight edges of the outer longitudinal edge are connected such that the outer longitudinal edge is recessed toward the centroid of figure of the radially outer surface of the first middle block, and
   an angle between the straight edges of the outer longitudinal edge is smaller than an angle between the straight edges of the inner longitudinal edge.

6. A two-wheeled vehicle tire for running on rough terrain comprising:
   a tread portion comprising middle blocks and shoulder blocks located between a tire equator and a tread edge,
   the middle blocks including a first middle block having a radially outer surface and a second middle block having a radially outer surface that has an area larger than an area of the radially outer surface of the first middle block, wherein
   the radially outer surface of the first middle block is not provided with sipes,
   the radially outer surface of the second middle block is provided with two sipes,
   each of the two sipes extends linearly over its entire length, across the radially outer surface completely in a tire axial direction so that the second middle block comprises a first portion defined between the two sipes,
   the radially outer surface of the first portion has an axially outer longitudinal edge extending in a tire circumferential direction and an axially inner longitudinal edge extending in a tire circumferential direction, and extends continuously from the axially outer longitudinal edge to the axially inner longitudinal edge, the two sipes are arranged non-parallel to each other so that the first portion has a circumferential length increasing toward the tread edge, and an actual length of the axially inner longitudinal edge is smaller than an actual length of the axially outer longitudinal edge, and the shoulder blocks are provided with no sipes or grooves, each of the shoulder blocks is defined such that its radially outer surface has a centroid of figure located in a shoulder region, the shoulder region being defined as extending from the tread edge toward the tire equator by a width of 1/6 of a tread development width, and each of the middle blocks is defined such that its radially outer surface has a centroid of figure located in a middle region, the middle region defined as extending from the shoulder region toward the tire equator to a position spaced apart from the tire equator toward the tread edge by a width of 1/6 of the tread development width.

7. The two-wheeled vehicle tire for running on rough terrain according to claim 1, wherein the actual length of the inner longitudinal edge is equal to or more than 2 mm.

8. The two-wheeled vehicle tire for running on rough terrain according to claim 6, wherein an area of the radially outer surface of the first middle block is equal to or more than 65% of an area of the radially outer surface of the second middle block.

9. The two-wheeled vehicle tire for running on rough terrain according to claim 6, wherein the tread portion further comprises a shoulder tie-bar that connects one of the shoulder blocks with one of the middle blocks.

10. The two-wheeled vehicle tire for running on rough terrain according to claim 6, wherein one of the two sipes extends parallel to a tire axial direction.

11. The two-wheeled vehicle tire for running on rough terrain according to claim 6, wherein one of the two sipes located on a leading side in a designated tire rotation direction is parallel to a tire axial direction.

12. The two-wheeled vehicle tire for running on rough terrain according to claim 6, wherein the second middle block comprises two second portions located on both outer sides of the first portion, and the first portion and the second portions have different heights.

13. The two-wheeled vehicle tire for running on rough terrain according to claim 12, wherein a maximum height of the first portion is greater than a maximum height of each of the second portions.

14. The two-wheeled vehicle tire for running on rough terrain according to claim 12, wherein radially outer surfaces of the second portions respectively have longitudinal straight edges each extending straight in a tire circumferential direction and both located on a tire equator side or alternatively a tread edge side, and in a plan view of the radially outer surface of the second middle block, the radially outer surface of the first portion comprises a projection that projects outwardly in a block-width direction from respective virtual extensions of the longitudinal straight edges of the radially outer surfaces of the second portions.

15. The two-wheeled vehicle tire for running on rough terrain according to claim 14, wherein in the plan view, an area of the protrusion is equal to or less than 50% of an entire area of the radially outer surface of the first portion.

* * * * *